United States Patent [19]

Marianowski, Leonard G. et al.

[11] Patent Number: 5,045,413
[45] Date of Patent: * Sep. 3, 1991

[54] FULLY INTERNAL MAINFOLDED FUEL CELL STACK

[75] Inventors: Marianowski, Leonard G., Mount Prospect, Ill.; Randy J. Petri, Highland, Ind.; Mark G. Lawson, Berwyn, Ill.

[73] Assignee: Institute of Gas Technology, Chicago, Ill.

[*] Notice: The portion of the term of this patent subsequent to Oct. 16, 2007 has been disclaimed.

[21] Appl. No.: 505,293

[22] Filed: Apr. 10, 1990

Related U.S. Application Data

[63] Continuation-in-part of Ser. No. 346,666, May 3, 1989, Pat. No. 4,963,442.

[51] Int. Cl.$^5$ .................. H01M 2/08; H01M 8/14
[52] U.S. Cl. ............................ 429/13; 429/16; 429/35; 429/39
[58] Field of Search .............. 429/13, 16, 35, 38, 429/39, 34

[56] References Cited

U.S. PATENT DOCUMENTS 4,769,298  9/1988  Hosaka .

OTHER PUBLICATIONS

Patent Abstracts of Japan, vol. 12, No. 273 (E-639) [3120], Jul. 29, 1988; & JP-A-63 53 858 (Ishikawajima Harima Heavy Ind. Co. Ltd) 08-03-1988.
Patent Abstracts of Japan, vol. 12, No. 130 (E-603) [2977]Apr. 21, 1988; & JP-A-62 256 381 (Ishikawajima Harima Heavy Ind. Co. Ltd) 09-11-1987.
JP-A-17 001 071 (Ishikawajima Harima Heavy Ind. Co. Ltd.) (16-03-1989) *FIG. 1* Patent Abstracts of Japan, vol. 13, No. 288 (E-781) [3636].
Patent Abstracts of Japan, vol. 13, No. 46 (E-711) [3394], Feb. 2, 1989; & JP-A-63 241 869 (Isikawajima Harima Heavy Ind. Co. Ltd.) 07-10-1988.
Patent Abstracts of Japan, vol. 13, No. 325 (E-792) [3673], Jul. 21, 1989; & JP-A-1 93 062 (Ishikawajima Harima Heavy Ind. Co. Ltd.) 12-04-1989.
Patent Abstracts of Japan, vol. 13, No. 88 (E-721) [3436], Feb. 28, 1989; & JP-A-63 266 776 (Ishikawajima Harima Heavy Ind. Co. Ltd.) 02-11-1988.
Patent Abstracts of Japan, vol. 13, No. 312 (E-788) [3660], Jul. 27, 1989; & JP-A-1 84 578 (Ishikawajima Harima Heavy Ind. Co. Ltd.) 29-03-1989.
Patent Abstract of Japan, vol. 9, No. 318 (E-366) [2041], Dec. 13, 1985; & JP-A-60 151 972 (Ishikawajima Harima Jukogyo K.K.) 10-08-1985.
JP-A-1 120 773 (Ishikawajima Harima Heavy Ind. Co. Ltd.) (12-05-1989) FIG. 6* & Patent Abstracts of Japan, vol. 13, No. 364 (E—805) [3712], Aug. 14, 1989.
Patent Abstracts of Japan, vol. 13, No. 518 (E-848) [3866], Nov. 20, 1989; & JP-A-1 211 863 (Ishikawajima Harima Heavy Ind. Co. Ltd.) 25-08-1989.

*Primary Examiner*—Anthony Skapars
*Attorney, Agent, or Firm*—Thomas W. Speckman; Douglas H. Pauley

[57] ABSTRACT

A fully internally manifolded fuel cell stack is provided by each separator plate and electrolyte in the fuel cell stack having a plurality of aligned perforations forming gas manifolds extending for the length of the cell stack. Each perforation through the separator plate is surrounded by a flattened manifold wet seal structure extending to contact the electrolytes on each face of the separator plate to form separator plate/electrolyte wet seals under cell operating conditions. Conduits through the extended manifold wet seal structure provides gas communication between one set of manifolds and the anode chambers on one face of the separator plates and conduits through the extended manifold wet seal structure on the opposite face of the separator plates provides gas communication between the other set of the manifolds and the cathode chambers on the other face of the separator plates. Extended wet seal structures formed of thin plate metal provide limited flexibility and resiliency to assure good sealing. This structure provides fully internal manifolding of and separation of fuel and oxidant gases to each of the unit fuel cells in the fuel cell stack.

19 Claims, 3 Drawing Sheets

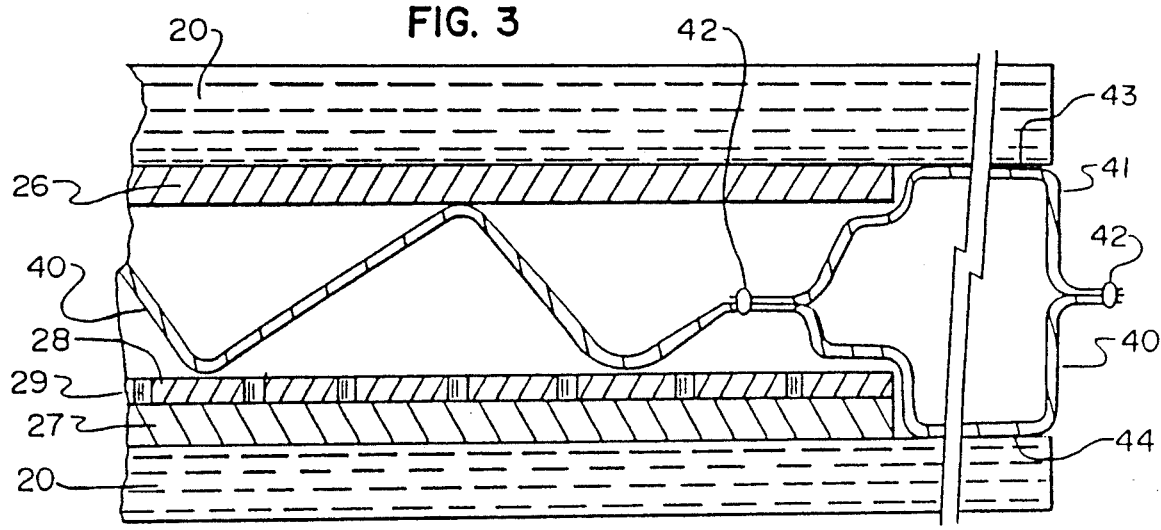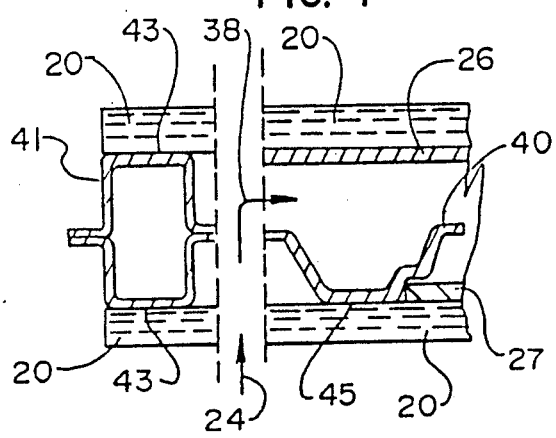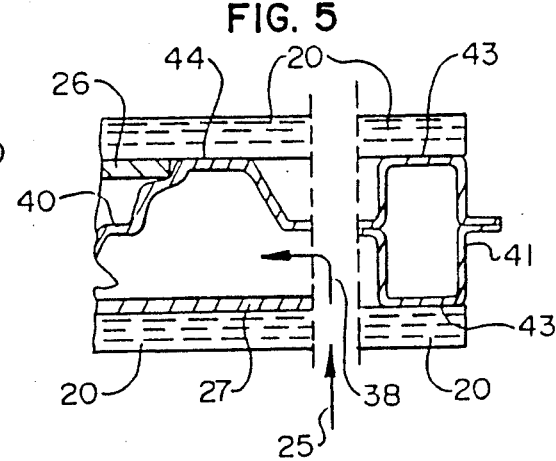

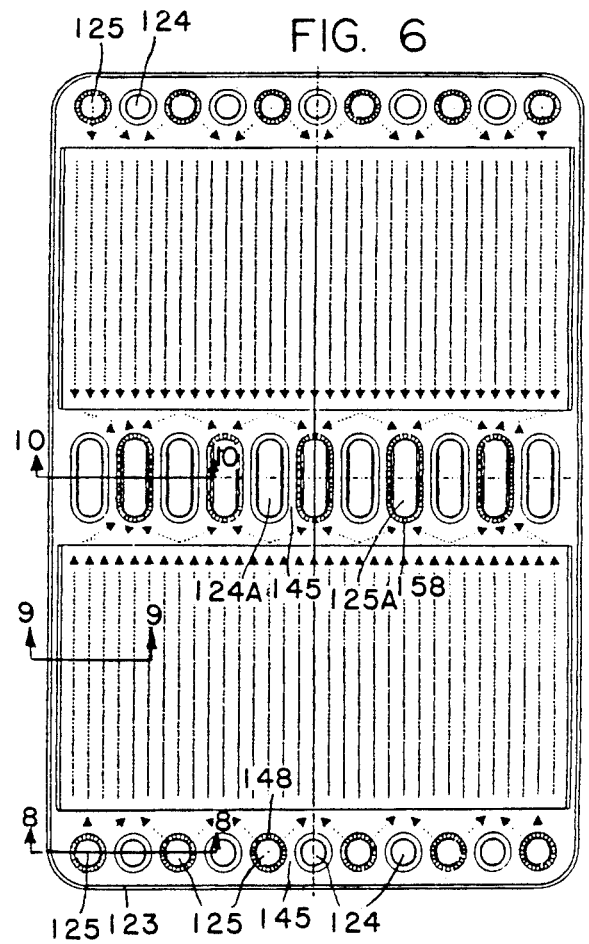
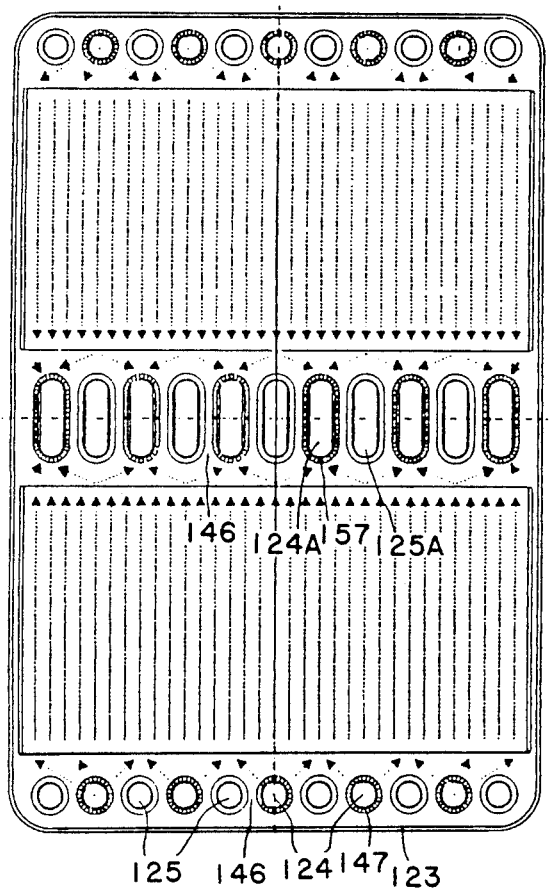
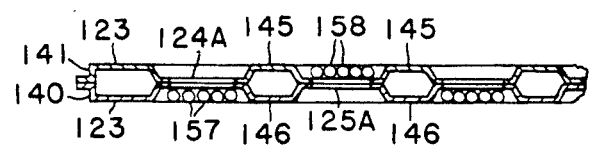
FIG. 10
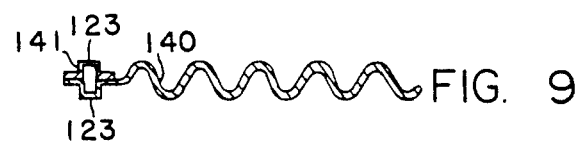
FIG. 9
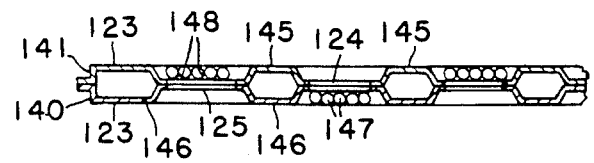
FIG. 8

FULLY INTERNAL MAINFOLDED FUEL CELL STACK

CROSS REFERENCE TO RELATED APPLICATION

This application is a continuation-in-part of earlier filed U.S. Patent application Ser. No. 346/666, filed May 3, 1989, entitled Internal Manifolded Molten Carbonate Fuel Cell Stack.

BACKGROUND OF THE INVENTION

1. Field of the Invention

This invention relates to internally manifolded fuel cell stacks, and in particular, a method and process for sealing fully internally manifolded cell stacks with wet seals between only the electrolyte and metallic separator plates to provide long term stability.

Generally, fuel cell electrical output units are comprised of a stacked multiplicity of individual cells separated by inert or bi-polar electronically conductive ferrous metal separator plates. Individual cells are sandwiched together and secured into a single stacked unit to achieve desired fuel cell energy output. Each individual cell generally includes an anode and cathode electrode, a common electrolyte tile, and a fuel and oxidant gas source. Both fuel and oxidant gases are introduced through manifolds to their respective reactant chambers between the separator plate and the electrolyte tile. The area of contact between the electrolyte and other cell components to maintain separation of the fuel and oxidant gases and prevent and/or minimize gas leakage is known as the wet seal. A major factor attributing to premature fuel cell failure is corrosion and fatigue in the wet seal area. This failure is hastened by corrosive electrolyte contact at high temperatures and high thermal stresses resulting from large temperature variations during thermal cycling of the cell causing weakening of the structure through intracrystalline and transcrystalline cracking. Such failures permit undesired fuel and/or oxidant gas crossover and overboard gas leakage which interrupts the intended oxidation and reduction reactions thereby causing breakdown and eventual stoppage of cell current generation. Under fuel cell operating conditions, in the range of about 500° to 700° C., molten carbonate electrolytes are very corrosive to ferrous metals which, due to their strength, are required for fuel cell housings and separator plates. The high temperature operation of stacks of molten carbonate fuel cells increases both the corrosion and thermal stress problems in the wet seal area, especially when the thermal coefficients of expansion of adjacent materials are different.

This invention provides fully internal manifolding of the fuel and oxidant gases to the individual cells of an assembled stack in a manner utilizing electrolyte/metal wet seals which, due to the design of the cell components, provides long term endurance and stability of fuel cell operation.

2. Description of the Prior Art

Commercially viable molten carbonate fuel cell stacks may contain up to about 600 individual cells each having a planar area in the order of eight square feet. In stacking such individual cells, separator plates separate the individual cells with fuel and oxidant each being introduced between a set of separator plates, the fuel being introduced between one face of a separator plate and the anode side of an electrolyte matrix and oxidant being introduced between the other face of the separator plate and the cathode side of a second electrolyte matrix.

The emphasis in fuel cell development has been in external manifolding of the fuel and oxidant gases by using channel manifolds physically separable from the fuel cell stack. However, the inlets and outlets of each cell must be open to the respective inlet and outlet manifolds which must be clamped onto the exterior of the cell stack. To prevent electrical shorting, insulation must be used between the metal manifolds and the cell stack. External manifolding has presented serious problems in maintaining adequate gas seals at the manifold/manifold gasket/cell stack interface while preventing carbonate pumping within the gasket along the potential gradient of the cell stack. Various combinations of insulating the metal manifold from the cell stack have been used, but with the difficulty of providing a sliding seal which is gas tight and electrically insulating while being carbonate impermeable under high temperature molten carbonate fuel cell operating conditions, no satisfactory solution has been found. The problem of manifolding and sealing becomes more severe when larger number of cells and larger planar areas are used in the cell stack. When greater number of cells are used, the electrical potential driving the carbonate in the seal area along the height of the stack increases, and when the planar area of the cell increases, the linear tolerances of each component and the side alignment of each component becomes extremely difficult to maintain in order to maintain the mating surface sealed between the manifold/manifold gasket/and cell stack.

Cell stacks containing 600 cells can be approximately 10 feet tall presenting serious problems of required stiffness of external manifolds and the application of a clamping force required to force the manifold onto the cell stack. Due to the thermal gradients between cell assembly and cell operating conditions, differential thermal expansions, and the necessary strength of materials used for the manifolds, close tolerances and very difficult engineering problems are presented.

Conventionally, stacks of individual molten carbonate fuel cells have been constructed with spacer strips around the periphery of a separator plate to form wet seals and to provide intake and exhaust manifolds. Various means of sealing in the environment of the high temperature fuel cell wet seal area are disclosed in U.S. Pat. No. 4,579,788 teaching the wet seal strips are fabricated utilizing powder metallurgy techniques; U.S. Pat. No. 3,723,186 teaching the electrolyte itself is comprised of inert materials in regions around its periphery to establish an inert peripheral seal between the electrolyte and frame or housing; U.S. Pat. No. 4,160,067 teaching deposition of inert materials onto or impregnated into the fuel cell housing or separator in wet seal areas; U.S. Pat. No. 3,867,206 teaching a wet seal between electrolyte-saturated electrodes; U.S. Pat. No. 4,761,348 teaching peripheral rails of gas impermeable material to provide a gas sealing function to isolate the anode and cathode from the oxidant and fuel gases, respectively; U.S. Pat. No. 4,329,403 teaching graded electrolyte composition for more gradual transition in the coefficient of thermal expansion in passing from the electrodes to the inner electrolyte region; and U.S. Pat. No. 3,514,333 teaching housing of alkali metal carbonate electrolytes in high temperature fuel cells by use of a thin aluminum sealing gasket. None of the above patents deal with sealing around internal fuel and oxidant in fuel cell stacks.

Gas sealing of a phosphoric acid fuel cell, which operates at about 150° to 220° C., by filling the pores of a porous material periphery of the cell constituents with silicon carbide and/or silicon nitride is taught by U.S. Pat. No. 4,781,727; and by impregnating interstitial spaces in substrate plate edge is taught by U.S. Pat. Nos. 4,786,568 and 4,824,739. The solution of sealing and corrosion problems encountered in low temperature electrolytic cells, such as bonding granular inert material with polytetrafluorethylene as taught by U.S. Pat. No. 4,259,389 gaskets of polyethylene as taught by U.S. Pat. No. 3,012,086; and "O" ring seals taught by U.S. Pat. No. 3,589,941 for internal manifolding of fuel only are not suitable for high temperature molten carbonate fuel cells.

U.S. Pat. No. 4,510,213 teaches transition frames surrounding the active portion of the cell units to provide fuel and oxidant manifolds to the gas compartments of the individual cells, the manifolds not passing through the separators nor the electrolyte tiles of the cells. The transition frames require complicated insulating between adjacent cells and are made up of several separate and complicated components. U.S. Pat. No. 4,708,916 teaches internal manifolding of fuel and external manifolding of oxidant of molten carbonate fuel cells wherein sets of fuel manifolds pass through electrodes as well as electrolytes and separators in a central portion and at opposite ends of the individual cells to provide shortened fuel flow paths. The end fuel manifolds are in a thickened edge wall area of the separator plate while the central fuel manifolds pass through a thickened central region and sealing tape impregnated with carbonate or separate cylindrical conduit inserts are provided extending through the cathode.

Internal manifolding has been attempted wherein multiple manifold holes along opposite edges of the cell have been used to provide either co- or counter-current flow of fuel and oxidant gases. These manifold holes for fuel have been located in a broadened peripheral wet seal area along opposing edges, but the manifolds have been complicated structures exterior to the electrolyte or pass through at least one of the electrodes. However, adjacent manifold holes are used for fuel and oxidant which provides short paths across a short wet seal area and leakage of the gases as well as the necessarily broadened peripheral seal area undesirably reducing the cell active area. Likewise, prior attempts to provide internal manifolding have used multiple manifold holes along broadened peripheral wet seal areas on each of all four edges of the cell to provide cross flow, but again short paths between adjacent fuel and oxidant manifold similar complicated structures and holes caused leakage of the gases and further reduced the cell active area.

SUMMARY OF THE INVENTION

This invention provides fully internally manifolded fuel cell stacks, especially suitably for use in high temperature molten carbonate fuel cell stacks. The fully internally manifolded fuel cells of this invention are suitable for any cell having planar components, especially high temperature fuel cells such as solid oxide fuel cells. In a generally rectangular fuel cell stack a plurality of fuel cell units, each fuel cell unit comprising an anode and a cathode, an electrolyte in contact on one side with the anode and in contact on the opposite side with the cathode, and a separator plate separating cell units between the anode of one cell and cathode of the adjacent cell forming an anode chamber between one side of the separator plate and the anode and a cathode chamber between the opposite side of the separator plate and the cathode. The fuel cell units are stacked and provided with end plates having the same internal configuration as the separator plates forming half cells at each end and clamped to provide rigid structure to the fuel cell stack. In the fuel cell stacks of this invention, the electrolytes and separator plates have the same configuration and extend to the edge of the fuel cell stack, while the electrodes and current collectors do not extend to the edge of the fuel cell stack. The separator plates have a flattened peripheral wet seal structure extending to contact the electrolytes on each face of the separator plates completely around their periphery forming a continuous peripheral separator plate/electrolyte wet seal under cell operating conditions.

The electrolytes and separator plates have a plurality of aligned perforations in desired locations, each separator plate perforation being surrounded by a flattened manifold wet seal structure extending to contact the electrolyte on each face of the separator plate forming a separator plate/electrolyte manifold wet seal under cell operating conditions surrounding each perforation to form a gas manifold through each perforation and extending through the cell stack. Conduits or holes through the extended manifold wet seal structure provide gas communication between fuel manifolds and the anode chambers on one face of the separator plates and conduits or holes through the extended manifold wet seal structure provide gas communication between the oxidant manifolds and the cathode chambers on the other face of the separator plates. This structure provides fully internal manifolding of fuel and oxidant gases to and from each of the unit fuel cells in the fuel cell stack.

The end plates are configured similarly to the separator plates on their inner sides and are provided with means for supply and exhaust from each of the sets of manifolds of the fuel cell stack. External means of supplying and exhausting fuel gas and oxidant gas to the appropriate sets of manifolds at the end plate connections may be provided by any means known to the art. By "sets of manifolds" we mean a first set makes up the fuel inlets, a second set spent fuel outlets, a third set oxidant inlets, and a fourth set spent oxidant outlets. The perforations through the separator plates and electrolytes forming the manifolds may be round, square, rectangular, triangular, or any other desired shape and size. While each such perforation is referred to as a single perforation, it may comprise baffling to provide desired gas distribution. Any number of manifolds may be provided through the separator plates and electrolytes as necessary to provide desired gas flow quantities and patterns across the active areas of the cell. It is important in this invention to provide full wet seals directly between the separator plate and electrolyte around each manifold with the edge of adjacent manifolds being separated by at least about 0.25 inch. This invention also provides a continuous peripheral wet seal directly between the separator plate and electrolyte exterior to the regions of the internal manifolds.

In one preferred embodiment, the separator plates in accordance with this invention are thin pressed metal plates provided with corrugations in the fully active fuel cell area and pressed to form on one face the full peripheral and the manifold wet seal structures with an upstanding wet seal structure welded to the opposite face of the separator plate to provide full peripheral and the manifold wet seals between the separator plate and electrolyte on opposite faces of the separator plates. Any structure may be used to provide the extended wet seal areas for forming wet seals directly between the separator plate and electrolyte, such as bars, strips formed by powder metallurgy techniques, and the like.

In a preferred embodiment the conduits or holes through the extended manifold wet seal structure providing gas communication between the manifold and the anode and cathode chambers may be openings provided by appropriately corrugated metal or may be holes through sheet metal or bar structures.

This invention provides simple wet seals between flattened, thin sheet metal structures and electrolyte, thereby providing assured sealing of one gas conduit from the adjacent gas conduit. This provides effective means for providing fully internally manifolded gas feed and removal from high temperature and corrosive fuel cells, such as, molten carbonate fuel cell stacks. Use of the structure of this invention also provides effective and varied means for providing carbonate to multi-cell stacks.

This invention provides a mass produceable configuration of the fuel cell components, particularly the separator plate and its cost effective fabrication. Use of the molten carbonate fuel cell units of this invention provides ease of assembly of the fuel cell stack and modularization for varying sizes of fuel cell stacks.

This invention also provides a process for production of electricity using the fully internally manifolded fuel cell stack, particularly, molten alkali metal carbonates fuel cell stacks.

BRIEF DESCRIPTION OF THE DRAWING

Further features of the invention will be apparent from the following detailed description of the invention read in conjunction with the drawing, wherein:

FIG. 3 is a sectional side view of a peripheral wet seal area of a fuel cell according to one embodiment of this invention;

FIG. 4 is a sectional side view of a single cell unit showing opening from a fuel manifold conduit to the anode compartment;

FIG. 5 is a sectional side view of the cell unit shown in FIG. 4 showing opening from an oxidant manifold conduit to the cathode compartment;

FIG. 6 is a front face view of another embodiment of a manifold plate for a fully manifolded fuel cell stack according to this invention;

FIG. 7 is a opposite face view of the manifold plate shown in FIG. 6;

FIG. 8 is an enlarged cross-sectional view along 8—8 shown in FIG. 6;

FIG. 9 is an enlarged cross-sectional view along 9—9 shown in FIG. 6; and

FIG. 10 is an enlarged cross-sectional view along 10—10 shown in FIG. 6.

DESCRIPTION OF PREFERRED EMBODIMENTS

This invention is directed toward fully internally manifolded fuel cell stacks. In preferred embodiments the electrolyte tile is penetrated by the manifold conduits and in specified areas the electrolyte contacts the separator plate to provide an electrolyte/separator plate peripheral wet seal for containment of fluids within the cell stack and an electrolyte/separator plate manifold seal for isolation of reactant compartments and for direction of fluids into and out of reactant compartments within individual molten carbonate fuel cells. This invention preferably utilizes thin sheet separator plates having pressed seal areas extending from one face of the separator plate and thin sheet forms extending from the opposite face of the separator plate to form seal areas. The thin sheet seal areas afford limited flexibility and resilience to provide tight sealing.

Figure 1:
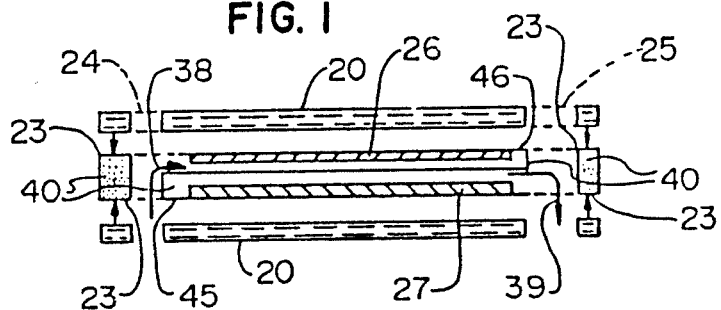
FIG. 1 is a schematic exploded side sectional view of a single cell along a diagonal to illustrate the principles of this invention.

Referring to FIG. 1, a schematic exploded sectional view along a corner to corner diagonal of a single cell of a fuel cell stack according to this invention is shown which provides flow of fuel and oxidant gases fully internal to the cell stack. According to this embodiment, manifold holes are provided in the corner areas of the electrolyte which extends to the edge of the cell together with the cell separator plates. By contact between the electrolyte and the separator plate on each face forming conventional wet seals on each face around the periphery of the electrolyte, the containment of the fluids is maintained. Through desired openings providing fluid communication between manifold holes and anode and cathode compartments the desired gaseous flow may be obtained while providing sealing of the manifold holes with conventional electrolyte/separator plate wet seals.

The matching manifold holes in the separator plates and electrolyte tiles form manifold conduits which are continuous for the entire height of the fuel cell stack for gas supply and exhaust. This invention provides that a manifold conduit extending to all cells in a fuel cell stack is supplied from a single external opening, whereas prior externally manifolded fuel cell stacks have required external openings to and from each individual fuel cell. The gases are fed to the fuel cell stack through an end plate which acts as one half cell and are exhausted through a similar end plate which acts as another half cell.

The manner in which fluids are fed to and withdrawn from fuel cell stacks can take on a wide variety of variations, the important aspect with respect to the present invention being that gas sealing is accomplished by sealing between the electrolyte tile and the separator plate in the conventional wet seal manner both around the periphery of the separator plate and in the gas manifold area as desired for conducting the gas to desired locations within each individual cell.

As shown in FIG. 1, electrolyte 20 and separator plate 40 extend to the outer edge of the cell and are sealed to each other around their periphery in wet seal areas 23. In FIG. 1, the individual molten carbonate fuel cell unit is shown with anode 26 spaced from one face of separator plate 40 to provide an anode chamber fed by fuel manifold hole 24 as indicated by arrow 38. On the other face of separator plate 40 cathode 27 is spaced from separator plate 40 to form a cathode chamber in communication with oxidant manifold holes 25 as indicated by arrow 39. Electrolyte 20 and separator plate 40 extend to the outer edge of the cell forming peripheral wet seal areas 23 which provide peripheral wet seals between the electrolyte and separator plate for containment of fluid. Fuel manifold wet seal area 45 and oxidant wet seal area 46 provide manifold sealing by electrolyte/separator plate wet seals and provide desired guidance of fluid to anode and cathode chambers on opposite sides of separator plate 40. No additional gaskets are used for sealing and the cell unit can accomodate a wide variety of carbonate addition techniques, including use of carbonate tapes. When carbonate tapes are used, the carbonate tapes and electrolyte matrix extend to the cell edges and although the inter-cell spacing decreases in proportion to the thickness of the carbonate tapes when they melt, sealing and conformity of all cell components is maintained at all times. During cell heat-up prior to carbonate tape melting, sealing is maintained around each manifold hole 24 and 25 because the carbonate tapes and the electrolyte matrix, such as $LiAlO_2$, extend adjacent to the respective sealing surfaces and contain a rubbery binder. During binder burnout, which occurs prior to carbonate melt, gas flows are maintained and sealing is obtained. When the binder is burned off and the cell temperature raised to the melting point of the carbonate, the melting carbonate is absorbed by the porous $LiAlO_2$ tape and the electrodes. The inter-cell spacing decreases as the carbonate tapes melt but at all stages from room temperature to operating temperatures of about 650° C. cell sealing is maintained. The limited flexibility and resiliency of the thin sheet metal in the seal areas aids in assuring maintenance of cell sealing.

Figure 2:
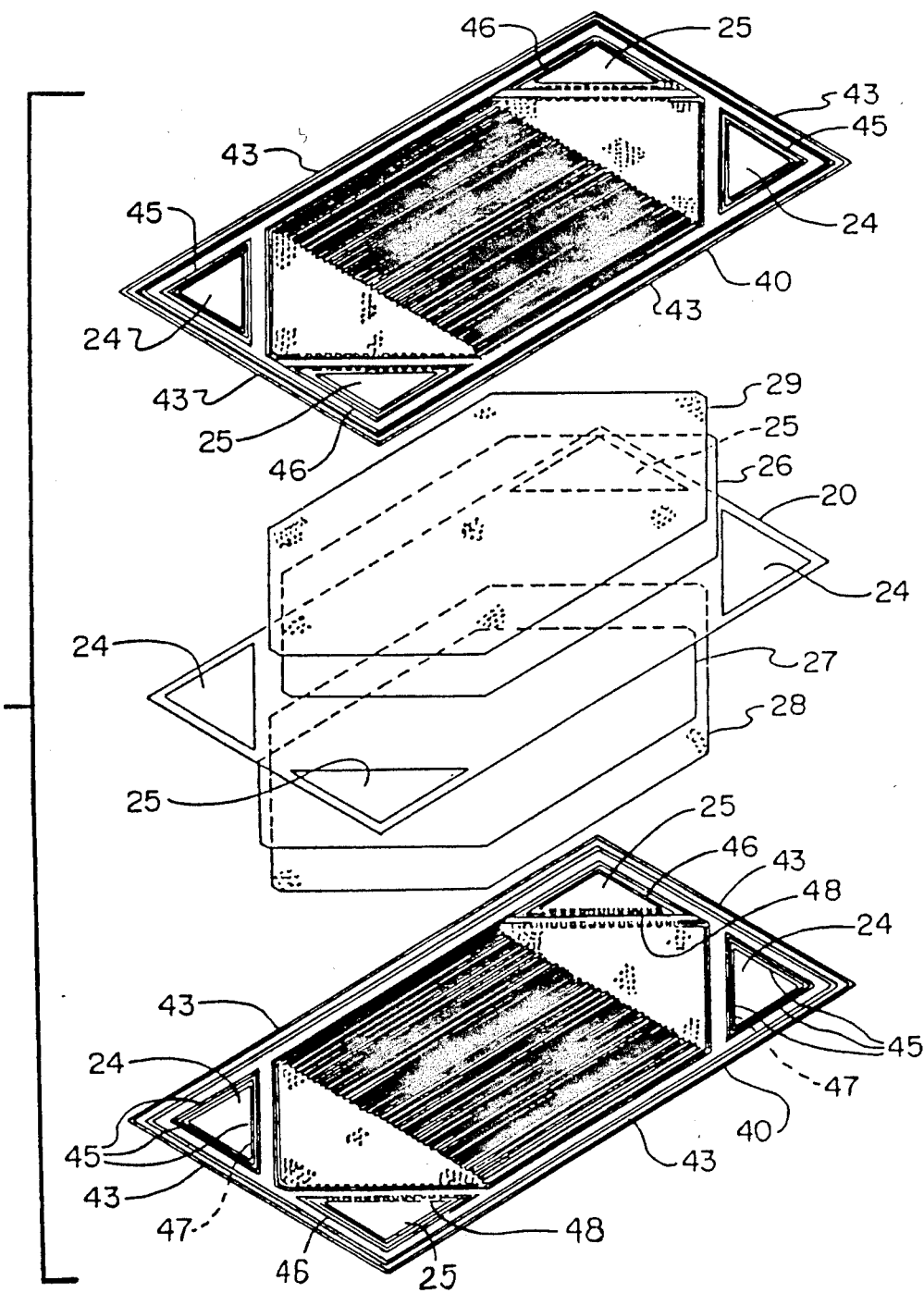
FIG. 2 is an exploded perspective view of a single cell unit of a fuel cell stack in accordance with one embodiment of this invention.

FIG. 2 is a perspective exploded view of a fuel cell unit of a molten carbonate fuel cell stack according to one embodiment of this invention with separator plates 40, cathode 27, cathode current collector 28, electrolytes 20, anode 26 and anode current collector 29. Both separator plates 40 and electrolytes 20 extend to the edge of the cell and form wet seals on both faces of separator plates 40 around its entire periphery in peripheral wet seal areas 43. Peripheral wet seal areas 43 are extended both upwardly and downwardly from the general plane of separator plate 40 to provide contact with the periphery of electrolytes 20 on both faces of separator plate 40. Separator plates 40 and electrolyte tiles 20 are both penetrated by corresponding fuel manifold holes 24 and oxidant manifold holes 25. In the embodiment shown in FIG. 2, both separator plates 40 and electrolyte tiles 20 are penetrated only in their corner areas by manifold holes to provide the longest possible spacing between the manifold holes. As shown in FIG. 2, it is preferred to have a manifold hole in each corner of separator plates 40 and electrolyte tiles 20. While the manifold holes shown in FIG. 2 are a preferred triangular shape providing easily formed straight thin sheet manifold wet seal areas, the manifold holes may be round, rectangular or any other desired shape. The manifold holes shown in FIG. 2 are single openings, but partitions may be used in the single openings as desired to direct gas flow across the cell reactant chambers. Fuel manifold wet seal areas 45 and oxidant manifold wet seal areas 46 are extended both upwardly and downwardly from the general plane of separator plate 40 to provide contact with the electrolyte 20 on both faces of separator plate 40 to form wet seals with the adjacent electrolyte 20 defining the gas conduits. The surface of anode 26 is about flush with the level of peripheral wet seal 43 and oxidant manifold wet seal 46 to provide wet seal contact between separator plate 40 and electrolyte 20 in those areas. On the opposite face of separator plate 40, the surface of cathode 27 is about flush the level of peripheral wet seal 43 to provide fuel manifold wet seal 45 contact between separator plate 40 and electrolyte 20 in those areas.

As best seen in FIG. 2, oxidant manifold holes 25 are sealed by oxidant manifold wet seals 46 providing oxidant flow only to the cathode chamber (adjacent the upper face of the separator plate as shown) by oxidant supply openings 48 and preventing gas flow to or from the anode chamber while fuel manifold holes 24 are sealed by fuel manifold wet seals 45 providing fuel flow by fuel supply openings 47 to the anode chamber (adjacent the lower face of the separator plate as shown) and preventing gas flow to or from the cathode chamber. While the manifold wet seals are shown as straight pressed sheet metal structures, they can be any desired shape or structure to prevent gas flow. The manifold wet seals form a double wet seal between fuel manifold hole 24 and oxidant manifold hole 25.

Separator plates 40 may be comprised of suitable materials providing desired physical strength and gas separation. In many cell stacks it is preferred to use bimetallic separator plates in which stainless steel may be used on the cathode face and nickel or copper on the anode face to avoid ferrous metal corrosion. Separator plates may also be fabricated from ferrous alloys, such as type 300 series stainless steel alloys. The separator plates provide the dual function of providing a gas chamber non-reactive separator as well as providing structural strength to the fuel cell as an internal load bearing member. While it is preferred to use separator plates having a corrugated cross-sectional shape to provide both strength and better gas circulation adjacent the electrodes, the principles of this invention are also applicable to flat separator plates structured to provide peripheral wet seal areas and to provide wet seals around internal manifold holes while allowing gas to pass to and from the internal manifolds as required for fuel cell operation. The fuel cell stack internal separator plates are desirably very thin sheets, in the order of about 0.010 inch.

Thin stamped stainless steel plates have been used in heat exchange technology as exemplified by the publications "Modern Designs For Effective Heat Transfer," American Heat Reclaiming Corp., 1270 Avenue of the Americas, New York, N.Y. 10020 and "Superchanger Plate and Frame Heat Exchanger," Tranter, Inc. Wichita Falls, Tex. 76307. These heat exchangers use a series of gasketed embossed or pressed metal plates bolted together between end frames to provide channels for passage of hot medium on one side of the plate and passage of cold medium on the other side of the plate. However, fuel cell stack separator plates present very different problems of sealing and corrosion under molten alkali metal carbonates fuel cell operating conditions and different manifold configuration, sealing, and fluid communication means since two fluids must pass in separated relation between adjacent separator plates. In heat exchange, only one fluid passes between adjacent heat exchange plates. However, the technology of fluid flow over the electrodes of the fuel cell stack of this invention may advantageously utilize design techniques and patterns of plate heat exchangers, such as herringbone, washboard, straight corrugations and mixed corrugations.

FIG. 3 shows in more detail a peripheral wet seal area in accordance with one embodiment of this invention wherein thin sheet separator plate 40 is corrugated with the peaks on one face of the corrugations adjacent cathode 27 support plate 28 with perforations 29 and formed to have flat thin sheet separator plate seal area 44 which lies adjacent electrolyte 20 on the cathode face of the cell. Separator plate wet seal strip 41 formed from thin metal strip material is welded by welds 42, or otherwise attached, to the anode face of separator plate 40 to provide flat separator plate wet seal strip wet seal area 43 which lies adjacent electrolyte 20 on the anode side of the cell. It is readily apparent that the position of the separator plate and the wet seal strip may be reversed and that spacing of separator wet seal strip wet seal area 43 and separator wet seal area 44 may be formed to fit the spacing requirements of individual cells.

FIG. 4 shows in cross-sectional view through a conduit between fuel manifold 24 and the anode chamber the manner in which separator plate fuel manifold wet seal area 45 between the lower face of separator plate 40 and electrolyte 20 prevents fuel flow to the cathode chamber and provides fuel flow to the anode chamber between anode 26 and the upper face of separator plate 40. Likewise, FIG. 5 shows in cross-sectional view through a conduit between oxidant manifold 25 and the cathode chamber the manner in which separator plate oxidant manifold wet seal area 44 between the upper face of separator plate 40 and electrolyte 20 prevents oxidant flow to the anode chamber while providing oxidant flow to the cathode chamber between cathode 27 and the lower face of separator plate 40. The fuel and oxidant passages may be formed by corrugations in separator plate 40, by holes through a strip fastened to separator plate 40, or by any other means suitable to distribute the gases as desired.

Another embodiment of a separator plate according to this invention is shown in FIGS. 6–10. In this embodiment, fuel supply and oxidant supply manifolds are arranged alternately along opposite ends of the thin sheet separator plate and spent fuel and spent oxidant manifolds are arranged alternately across a central region of the thin sheet separator plates to provide a split gas flow and greater mechanical stability of thin separator plates of large surface area. The thin metal separator plates are constructed in the same fashion as described above with pressed corrugations in the active areas to support the electrodes and to provide appropriate anode and cathode gas chamber volume and with pressed areas extending outwardly from the plane of the thin separator plate to form thin plate wet seal areas on one face of the plate and an attached outwardly extending thin formed sheet metal strip to form wet seal areas on the other face of the separator plate. FIG. 6 shows the top or front face of a separator plate while FIG. 7 shows the reverse face of the same separator plate. The electrochemically active areas of separator plate 140 are corrugated, as best seen in FIG. 9, with pressed periphery wet seal area 123 extending beyond the corrugations for contact with the electrolyte of one cell at periphery wet seal area 123, and pressed thin metal wet seal strip 141 attached to the periphery of the opposite face of separator plate 140 and extending beyond the corrugations to contact the electrolyte of the adjacent cell at periphery wet seal area 123. Oxidant manifold holes 125 are arranged alternately to fuel manifold holes 124 across opposite end regions and oxidant manifold holes 125A arranged alternately to fuel manifold holes 124A in the central region of separator plate 140. The series of oxidant manifold holes and fuel manifold holes, as shown in these figures, provide fuel and oxidant supply at opposite ends of separator plate 140 and fuel an oxidant removal in the central portion of separator plate 140. As best seen in FIG. 8, oxidant as supplied through manifold holes 125 and pass through oxidant supply openings 148 to the active surface of separator plate 140, as shown by the arrows in FIG. 6. The oxidant passes through the channels of corrugated separator plate 140 forming the cathode gas compartment to oxidant outlet openings 158, as shown by the arrows in FIG. 6, feeding oxidant manifold holes 125A. In a similar fashion, fuel is supplied through fuel manifold holes 124 to fuel supply openings 147, passes through channels of corrugated separator plate 140 forming the anode gas compartment to fuel outlet openings 157, as shown by the arrows in FIG. 7, feeding fuel manifold holes 124A.

The co-linear flow of fuel and oxidant gases on opposite faces of the separator plate is shown in FIGS. 6 and 7 with the supply manifolds at opposite ends of the separator plate and the outlet manifolds in a central region of the separator plate. Using the same separator plate reversed co-linear flow of fuel and oxidant gases on opposite faces of the plate may be obtained by using the central fuel and oxidant manifolds for supply and the end fuel and oxidant manifolds for outlets. Using the same separator plates counterflow of fuel and oxidant gases on opposite faces of the separator plate may be obtained by supplying one of the fuel or oxidant through the central fuel or oxidant manifolds while withdrawing the gas through corresponding outlet manifolds at both ends and introducing the other gas through the end manifolds and withdrawing through the central manifolds. It is thus seen that various desired gas flow patterns may be obtained on opposite faces of the separator plate through use of the identical separator plate and only altering the supply to the manifold or manifolds exterior to the cell.

We have found that by using thin metal sheet material in all wet seal areas of the separator plate, due to the limited flexibility and resiliency in the wet seal area upon assembly of the fuel cell stack minimization or prevention of gas leakage can be achieved across wet seals at least ¼ inch wide separating adjacent fuel and oxidant manifolds. The thin sheet metal separator plates according to this invention show good mechanical strength and provide ease of fabrication. The split flow design of separator plates as shown in FIGS. 6–10, provides increased stiffness to the overall separator plate by the support of wet seal areas surrounding the manifold holes in the central portion of the plate. This design also allows fabrication of electrodes that are only a portion, in this case, half of the active current producing area of the fuel cells, facilitating handling of the electrodes and allowing continuous processing such as tape casting and sintering to be performed with smaller equipment. An important feature of this invention is the flattened thin metal upstanding wet seal areas of the separator plate providing contact directly with the electrolyte of one cell on one face and the adjacent cell on the opposite face, the fuel and oxidant conduits passing through only the separator plates and the electrolytes in the fuel cell stack.

By use of separator plate/electrolyte wet seals, communication between the fuel manifold and only the anode face of the separator plate and between the oxidant manifold and only the opposite cathode face of the separator plate, can be achieved without porous gaskets as are essential when external manifolding is used. Further, each gas manifold seal area may be aluminized to reduce corrosive and other wicking processes.

Using the fully internal manifolding of this invention, the inter-cell changes of distance resulting from melting of the carbonates tape occurs at the factory assembly site and once such melting occurs there are no further changes in inter-cell distances. The height of the cell stack shipped from the factory will be the same as that during operation in a pressure vessel at the use site. Thus, the only follow up required during fuel cell stack operation is that required to maintain the cell holding force on the active and seal areas.

While in the foregoing specification this invention has been described in relation to certain preferred embodiments thereof, and many details have been set forth for purposes of illustration, it will be apparent to those skilled in the art that the invention is susceptible to additional embodiments.

We claim:

1. In a generally rectangular fuel cell stack comprising a plurality of fuel cell units, each said fuel cell unit comprising an anode and a cathode, an electrolyte in contact with one face of said anode and an electrolyte in contact with an opposite facing face of said cathode, and a separator plate separating said cell unit between said anode and cathode forming an anode chamber between one face of said separator plate and said anode and a cathode chamber between the opposite face of said separator plate and said cathode, said anode chamber in gas communication with fuel gas supply and outlet and said cathode chamber in gas communication with oxidant gas supply and outlet the improvement comprising; said electrolytes and said separator plates extending to the edge of said fuel cell stack, said separator plates having a flattened peripheral wet seal structure extending to contact said electrolytes on each face of said separator plates completely around their periphery forming a separator plate/electrolyte wet seal under cell operating conditions, said electrolytes and said separator plates each having a plurality of aligned perforations said perforations in said separator plates being surrounded by a flattened manifold wet seal structure extending to contact said electrolyte on each face of said separator plate forming a separator plate/electrolyte wet seal under cell operating conditions to form a plurality of gas manifolds extending through said cell stack, conduits through said extended manifold wet seal structure providing fuel gas communication between one set of said manifolds and said anode chambers on one face of said separator plates and conduits through said extended manifold wet seal structure providing oxidant gas communication between the other set of said manifolds and said cathode chambers on the other face of said separator plates, thereby providing fully internal manifolding of fuel and oxidant gases to and from each said unit fuel cell in said fuel cell stack.

2. In a fuel cell stack according to claim 1 wherein end plates are configured the same as said separator plates on their inner faces and form half cells on each end of said fuel cell stack.

3. In a fuel cell stack according to claim 2 wherein said separator plates are pressed metal plates.

4. In a fuel cell stack according to claim 3 wherein said flattened peripheral wet seal structure on one face of said separator plate comprises a pressed shaping of said separator plate to form said extended peripheral wet seal on said one face of said separator plate and on the other face of said separate plate comprises a pressed sheet metal shape forming said extended peripheral wet seal fastened to said other face of said separator plate.

5. In a fuel cell stack according to claim 4 wherein said extended manifold wet seal structure on one face of said separator plate comprises a pressed shaping of said separator plate to form said extended manifold wet seal on said one face of said separator plate and on the other face of said separator plate comprises a pressed sheet metal shape forming said extended manifold wet seal fastened to said other face of said separator plate.

6. In a fuel cell stack according to claim 5 wherein said conduits through said extended manifold wet seal structure are formed by corrugated metal.

7. In a fuel cell stack according to claim 5 wherein said conduits through said extended manifold wet seal structure are holes through sheet metal structures.

8. In a fuel cell stack according to claim 1 wherein said separator plates are pressed metal plates.

9. In a fuel cell stack according to claim 1 wherein said flattened peripheral wet seal structure on one face of said separator plate comprises a pressed shaping of said separator plate to form said extended peripheral wet seal on said one face of said separator plate and on the other face of said separator plate comprises a pressed sheet metal shape forming said extended peripheral wet seal fastened to said other face of said separator plate.

10. In a fuel cell stack according to claim 1 wherein said extended manifold wet seal structure on one face of said separator plate comprises a pressed shaping of said separator plate to form said extended manifold wet seal on said one face of said separator plate and on the other face of said separator plate comprises a pressed sheet metal shape forming said extended manifold wet seal fastened to said other face of said separator plate.

11. In a fuel cell stack according to claim 1 wherein said conduits through said extended manifold wet seal structure are formed by corrugated metal.

12. In a fuel cell stack according to claim 1 wherein said conduits through said extended manifold wet seal structure are holes through sheet metal structures.

13. In a fuel cell stack according to claim 1 wherein said electrolyte comprises alkali metal carbonates.

14. In a fuel cell stack according to claim 13 wherein said flattened peripheral wet seal structure on one face of said separator plate comprises a pressed shaping of said separator plate to form said extended peripheral wet seal on said one face of said separator plate and on the other face of said separator plate comprises a pressed sheet metal shape forming said extended peripheral wet seal fastened to said other face of said separator plate.

15. In a fuel cell stack according to claim 14 wherein said extended manifold wet seal structure on one face of said separator plate comprises a pressed shaping of said separator plate to form said extended manifold wet seal on said one face of said separator plate and on the other face of said separate plate comprises a pressed sheet metal shape forming said extended manifold wet seal fastened to said other face of said separator plate.

16. A process for production of electricity in a generally rectangular fuel cell stack comprising a plurality of fuel cell units, each said fuel cell unit comprising an anode and a cathode, an electrolyte in contact with one face of said anode and an electrolyte in contact with an opposite facing face of said cathode, and a separator plate separating said cell unit between said anode and cathode forming an anode chamber between one face of said separator plate and said anode and a cathode chamber between the opposite face of said separator plate and said cathode, the improvement comprising; passing fuel and oxidant gases through fully internal manifold conduits to and from each fuel cell unit in said fuel cell stack, said internal manifold conduits formed by said electrolytes and said separator plates each having a plurality of aligned perforations, each said perforation being surrounded by a flattened manifold wet seal structure extending to contact said electrolyte on each face of said separator plate forming a separator plate/electrolyte wet seal under cell operating conditions to form a plurality of gas manifolds extending through said cell stack, conduits through said extended manifold wet seal structure providing fuel gas communication between one set of said manifolds and said anode chambers on one face of said separator plates and conduits through said extended manifold wet seal structure providing oxidant gas communication between the other set of said manifolds and said cathode chambers on the other face of said separator plates, thereby providing fully internal manifolding of fuel and oxidant gases to and from each said unit fuel cell in said fuel cell stack.

17. A process according to claim 16 wherein passing said fuel gas and oxidant gas through said conduits through said extended manifold wet seal structure, said conduits comprising corrugated metal.

18. A process according to claim 16 comprising passing said fuel gas and oxidant gas through said conduits through said extended manifold wet seal structure, said conduits comprising holes through sheet metal structures.

19. A process according to claim 16 wherein said electrolytes are alkali metal carbonates.

* * * * *

UNITED STATES PATENT AND TRADEMARK OFFICE
CERTIFICATE OF CORRECTION

PATENT NO. : 5,045,413

DATED : September 3, 1991

INVENTOR(S) : Leonard G. Marianowski et al.

It is certified that error appears in the above—identified patent and that said Letters Patent is hereby corrected as shown below:

On the title page, Item [54]:

In the title please delete "Mainfolded" and in its place insert --Manifolded--.

Signed and Sealed this

Thirty-first Day of August, 1993

*Attest:*

BRUCE LEHMAN

*Attesting Officer*  *Commissioner of Patents and Trademarks*